Patented Oct. 16, 1923.

1,471,252

UNITED STATES PATENT OFFICE.

FELIX EUGENE FALVET, OF PARIS, FRANCE.

HIGH-SPEED TOOL AND PROCESS OF MAKING THE SAME.

No Drawing.  Application filed November 17, 1920. Serial No. 424,687.

*To all whom it may concern:*

Be it known that I, FELIX EUGENE FALVET, a citizen of the French Republic, residing in Paris, France, have invented certain new and useful Improvements in High-Speed Tools and Processes of Making the Same, of which the following is a specification.

This invention relates to high speed tools and the process of the manufacture of tools or the like from the scrap of high speed or special steels. Hitherto high speed or special steel scrap has been mixed with other steels, and treated in metallurgical furnaces in order to obtain blooms of a desired composition.

According to this invention it is possible to obtain tools or the like directly by casting high speed or special steel scrap. Thus lathe tools, cutters, bits, milling cutters, etc., can be obtained and on leaving the moulds, these parts merely have to be ground, without undergoing rolling or drawing or any hardening operation. Such tools are without blow holes.

The scrap to be treated is introduced into closed crucibles of graphite or other suitable material, the temperature of which is gradually raised. After heating for a few moments, the temperature is raised quickly in order to arrive at bright red and even white heat, that is to say at a temperature of about 1200° C. At that temperature, the crucible is opened, and ferro-cyanide of potassium is added. Instead of ferro-cyanide, ferri-cyanide could be used, but the latter substance, although giving the same results as ferro-cyanide, has the drawback of perishing in the fire. Obviously the proportions of ferro-cyanide of potassium or of ferri-cyanide can vary ad infinitum; but these proportions should be preferably less than 5% of the mass treated. The proportion of ferro-cyanide or of ferri-cyanide to be used, will be the greater, the harder the steel to be obtained. For instance from 2 to 10 parts of ferro-cyanide per 1000 of steel, that is to say, high speed steels with 18% of tungsten, and 2 to 5% for the higher speed steels. These proportions are slightly increased in all cases in which the steel scrap is oxidized or impregnated with oil, whereby an excess of slag is formed in the materials in fusion.

Chloride of barium is added when the scrap is oxidized or contains moulding sand due to casting the steel before, in the proportion of 1 to 5 per 1000 of the steel.

The cyanide covers the molten mass and prevents the oxidation of the upper portion of the metal and absorbs those impurities such as sulphur contained in the mass.

After the addition of the cyanide, the temperature is raised to about 1800° C, and the metal is then cast.

By the addition, before casting the molten metal, of a small supplementary quantity (that is to say, the same quantity as that previously referred to) of the ferro-cyanide of potassum, with or without the addition of barium chloride or other suitable chloride which facilitates the formation of slag, the molten metal acquires a white appearance, which is a sign of decarburization.

The steels thus obtained from scrap containing 1.5% of carbon, can be forged at the cherry red temperature after reheating.

As a proportion exceeding 1.5% of carbon renders steel unsuitable for forging, it may be concluded that the steels thus treated, have not absorbed during their treatment any quantity of carbon. The metal thus obtained is so fluid that it is possible to cast absolutely sound parts 2½mm. thick.

The moulds are prepared of ordinary foundry sand as for any other metal.

What I claim as my invention and desire to secure by Letters Patent is:—

1. In the method of making tools from high speed scrap, the steps consisting in heating said scrap in a closed graphite crucible to a red heat, opening said crucible and adding ferro-cyanide of potassium to said scrap, raising the temperature of said scrap, and casting it to the desired shape.

2. In the process of treating high speed steel scrap, the steps consisting in heating the scrap, adding ferro-cyanide to said scrap, further heating and casting said scrap.

3. In the process of treating high speed steel scrap, the steps consisting in heating the scrap, adding chloride of barium to deoxidize said metal, adding ferro-cyanide to prevent further oxidation and to absorb certain impurities contained in said metal, heating said metal, and casting the same.

4. In the process of manufacturing tools or the like from high speed or special steel scrap, the step consisting in heating said scrap in crucibles of graphite, raising the temperature to approximately 1200° C., adding a suitable quantity of ferro-cyanide of potassium, raising the temperature to approximately 1800° C., and casting the metal directly into molds.

5. In the process of manufacturing tools or the like from high speed or special steel scrap, the steps consisting in heating said scrap in crucibles of graphite, raising the temperature to approximately 1200° C., adding a suitable quantity of ferro-cyanide of potassium, raising the temperature to approximately 1800° C., adding a small further quantity of ferro-cyanide of potassium, and casting the metal directly into molds.

6. In the process of manufacturing tools or the like from high speed or special steel scrap, the steps consisting in heating said scrap in crucibles of graphite, raising the temperature to approximately 1200° C., adding a suitable quantity of ferro-cyanide of potassium, raising the temperature to approximately 1800° C., adding a small further quantity of ferro-cyanide of potassium, adding a chloride facilitating the formation of slag, and casting the metal directly into the molds.

In testimony whereof I affix my signature.

FELIX EUGENE FALVET.